(12) United States Patent
Tatsukawa

(10) Patent No.: US 11,067,244 B2
(45) Date of Patent: Jul. 20, 2021

(54) VEHICLE HEADLAMP HAVING A HIGH BEAM LIGHT SOURCE AND AN INCLINED LASER DIODE

(71) Applicant: KOITO MANUFACTURING CO., LTD., Tokyo (JP)

(72) Inventor: Masashi Tatsukawa, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 17/074,718

(22) Filed: Oct. 20, 2020

(65) Prior Publication Data

US 2021/0131637 A1  May 6, 2021

(30) Foreign Application Priority Data

Oct. 30, 2019 (JP) .............................. JP2019-197509

(51) Int. Cl.
*F21S 41/663* (2018.01)
*F21S 41/16* (2018.01)
*B60Q 1/04* (2006.01)
*B60Q 1/00* (2006.01)
*F21W 102/13* (2018.01)

(52) U.S. Cl.
CPC .......... *F21S 41/663* (2018.01); *B60Q 1/0041* (2013.01); *B60Q 1/04* (2013.01); *F21S 41/16* (2018.01); *F21W 2102/13* (2018.01)

(58) Field of Classification Search
CPC .......... F21S 41/663; F21S 41/16; F21S 41/18; F21Y 2102/13; B60Q 1/0041
See application file for complete search history.

(56) References Cited

U.S. PATENT DOCUMENTS 10,023,102 B2 *  7/2018  Mouri ................... F21S 41/143

FOREIGN PATENT DOCUMENTS

JP          2003-272415 A        9/2003

* cited by examiner

*Primary Examiner* — Robert J May
(74) *Attorney, Agent, or Firm* — Abelman, Frayne & Schwab

(57) ABSTRACT

A vehicle headlamp includes: a first light source configured to form at least a high-beam light distribution pattern; and a second light source including a laser diode and configured to form an additional light distribution pattern that irradiates a distance equal to or farther than that of the high-beam light distribution pattern. An optical axis of the second light source is configured to be inclined by a predetermined angle in the left-right direction from an optical axis of the first light source, at least during a period while light is irradiated.

7 Claims, 3 Drawing Sheets

VEHICLE HEADLAMP HAVING A HIGH BEAM LIGHT SOURCE AND AN INCLINED LASER DIODE

CROSS-REFERENCE TO RELATED APPLICATIONS

This application is based on and claims priority from Japanese Patent Application No. 2019-197509, filed on Oct. 30, 2019, with the Japan Patent Office, the disclosure of which is incorporated herein in its entirety by reference.

TECHNICAL FIELD

The present disclosure relates to a vehicle headlamp.

BACKGROUND

Japanese Patent Laid-Open Publication No. 2003-272415 discloses a vehicle headlamp capable of forming a high-beam light distribution pattern.

SUMMARY

There is a demand to secure a distant view in some cases. As a result, in addition to a light source unit capable of forming a usual high-beam light distribution pattern, it may be considered mounting an additional light source unit capable of forming a further additional light distribution pattern.

It is possible to secure a distant view by irradiating light from the additional light source unit in parallel with the front-rear direction of a vehicle. However, there is a demand to secure a wide view in the left-right direction at a distance.

The present disclosure is to provide a vehicle headlamp capable of securing a wide view in the left-right direction at a distance.

A vehicle headlamp according to one aspect of the present disclosure includes: a first light source unit capable of forming at least a high-beam light distribution pattern; and a second light source unit including a laser diode and capable of forming an additional light distribution pattern that irradiates a distance that is equal to or farther than that of the high-beam light distribution pattern. An optical axis of the second light source unit is configured to be inclined by a predetermined angle in the left-right direction from an optical axis of the first light source unit, at least while light is irradiated.

According to the above configuration, it is possible to secure a wide view in the left-right direction at a distance.

According to the present disclosure, it is possible to provide a vehicle headlamp capable of securing a wide view in the left-right direction at a distance.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
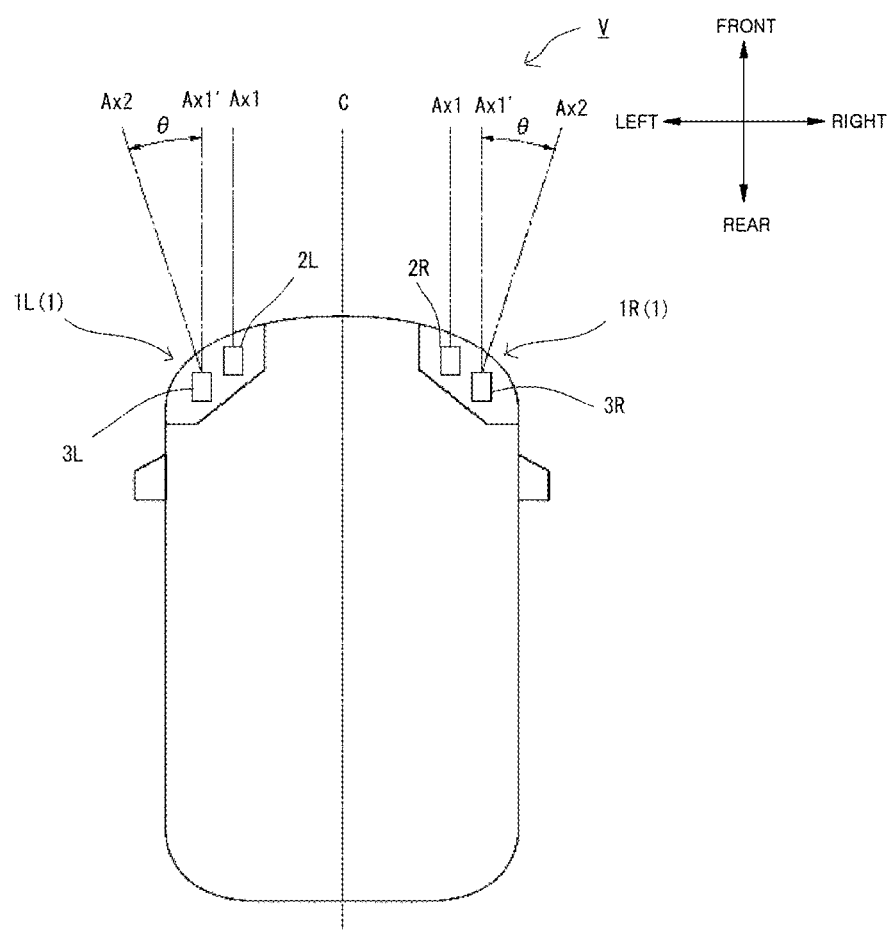
FIG. 1 is a view illustrating a vehicle on which a vehicle headlamp according to an embodiment is mounted.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Hereinafter, embodiments of the present disclosure (hereinafter, referred to as "the embodiment") will be described with reference to the drawings. Dimensions of members illustrated in the drawings may be different from actual dimensions of the members for convenience of explanation.

Further, in the descriptions of the embodiment, the "left-right direction," the "upward-downward direction," and the "front-rear direction" may be appropriately stated for convenience of description. Those directions are relative directions set for the vehicle illustrated in FIG. 1. Here, the "left-right direction" is a direction including the "left direction" and the "right direction." The "upward-downward direction" is a direction including the "upper direction" and the "downward direction." The "front-rear direction" is a direction including the "front direction" and the "rear direction." Although not illustrated in FIG. 1, the upward-downward direction is a direction perpendicular to the left-right direction and the front-rear direction.

A vehicle headlamp according to the embodiment will be described below with reference to FIG. 1.

FIG. 1 is a view illustrating a vehicle V on which the vehicle headlamp according to the embodiment is mounted. The vehicle V is a vehicle (automobile) capable of traveling in an automatic driving mode. As illustrated in FIG. 1, vehicle headlamps 1 (1L and 1R) are provided in both sides of the front portion of the vehicle V.

The vehicle headlamp 1 (hereinafter, referred to as a "right side headlamp 1R") provided on the right side of the front portion of the vehicle V includes a first light source unit 2R and a second light source unit 3R. The first light source unit 2R and the second light source unit 3R are disposed inside a lamp chamber formed by a housing opened to the front side of the vehicle and a front lens that covers the opening of the housing.

The vehicle headlamp 1 (hereinafter, referred to as a "left side headlamp 1L") provided on the left side of the front portion of the vehicle V includes a first light source unit 2L and a second light source unit 3L. The first light source unit 2L and the second light source unit 3L are disposed inside a lamp chamber formed by a housing opened to the front side of the vehicle and a front lens that covers the opening of the housing.

The first light source unit 2R and the second light source unit 3R of the right side headlamp 1R and the first light source unit 2L and the second light source unit 3L of the left side headlamp 1L are symmetrically disposed with respect to a vehicle center line C. In the example, the second light source units 3L and 3R are disposed outside the vehicle from the first light source units 2L and 2R.

The basic configuration (the first light source unit 2L and the second light source unit 3L) of the left side headlamp 1L is equal to the basic configuration (the first light source unit 2R and the second light source unit 3R) of the right side headlamp 1R. In the following, descriptions will be made on the right side headlamp 1R, and the descriptions on the configuration of the left side headlamp 1L overlapping with the right side headlamp 1R will be omitted.

In the right side headlamp 1R, the first light source unit 2R is a light source unit capable of forming a high-beam light distribution pattern that illuminates a region at a distance. The first light source unit 2R is disposed such that an optical axis Ax1 thereof is parallel to the front-rear direction of the vehicle. The optical axis Ax1 of the first light source unit 2R is a straight line that connects the reference point (e.g., light source center or projection lens center) of the first light source unit 2R and a point on a virtual vertical screen in front of the vehicle where the luminance intensity of the first light source unit 2R is maximum.

The first light source unit 2R includes, for example, one or more light emitting elements such as light emitting diodes (LEDs) or laser diodes (LDs), and an optical member such as a projection lens or a reflector.

The second light source unit 3R is a light source unit capable of illuminating a region at a distance similarly to the first light source unit 2R. The second light source unit 3R is capable of forming an additional light distribution pattern that irradiates a distance that is equal to or farther than that of the high-beam light distribution pattern formed by the first light source unit 2R. The second light source unit 3R includes one or more light emitting elements of a laser diode (LD). Further, the second light source unit 3R includes, for example, an optical member such as a projection lens or a reflector.

The second light source unit 3R is configured such that an optical axis Ax2 thereof is inclined by a predetermined angle θ in the left-right direction with respect to the optical axis Ax1 of the first light source unit 2R, at least while irradiating light. The predetermined angle θ may be 3° to 5°. In FIG. 1, an optical axis Ax1' is a virtual optical axis in parallel with the optical axis Ax1.

For example, the second light source unit 3R may be fixed in a state where the optical axis Ax2 is inclined by the predetermined angle θ in the left-right direction with respect to the optical axis Ax1. Further, the second light source unit 3R may be configured to be rotatable around the rotation axis such that the angle of the optical axis Ax2 in the left-right direction with respect to the optical axis Ax1 is switched between 0° and the predetermined angle θ. In this case, the second light source unit 3R is controlled such that the optical axis Ax2 forms the predetermined angle θ in the left-right direction with respect to the optical axis Ax1, at least while irradiating light.

The optical axis Ax2 of the second light source unit 3R is a straight line that connects the reference point (e.g., light source center or projection lens center) of the second light source unit 3R and a point on a virtual vertical screen in front of the vehicle where the luminance intensity of the second light source unit 3R is maximum.

In a case where "the optical axis Ax2 of the second light source unit 3R is inclined by a predetermined angle in the left-right direction with respect to the optical axis Ax1 of the first light source unit 2R," the straight line that connects the reference point of the second light source unit 3R and the point on the virtual vertical screen in front of the vehicle where the luminance intensity of the second light source unit 3R is maximum is in a state of being inclined by a predetermined angle in the left-right direction with respect to the straight line that connects the reference point of the first light source unit 2R and the point on the virtual vertical screen in front of the vehicle where the luminance intensity of the first light source unit 2R is maximum. In other words, the distance in the left-right direction between the point where the luminance intensity of the first light source unit 2R is maximum and the point where the luminance intensity of the second light source unit 3R on the virtual vertical screen in the first position in front of the vehicle is smaller than the distance in the left-right direction between the point where the luminance intensity of the first light source unit 2R is maximum and the point where the luminance intensity of the second light source unit 3R on the virtual vertical screen in the second position that is further forward than the first position.

Next, an irradiation range of the vehicle headlamp 1 of the embodiment will be described with reference to FIGS. 2 to 4.

Figure 2:
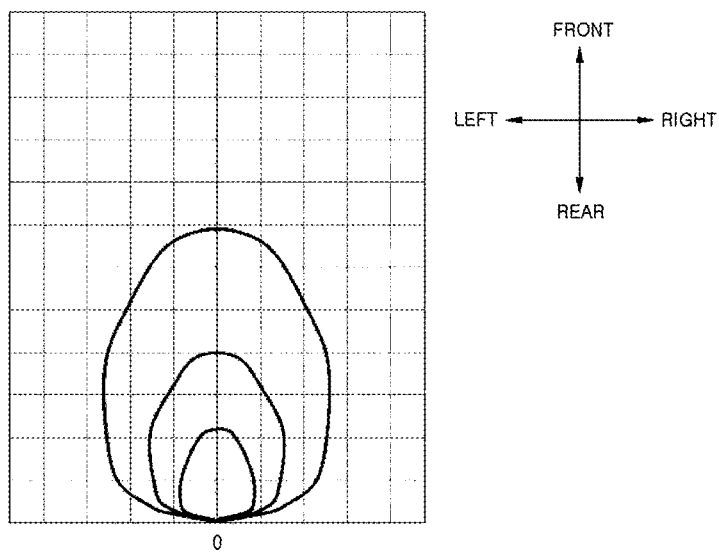
FIG. 2 is a view illustrating an illuminance contour line of light irradiated by a first light source unit of left and right headlamps.

FIG. 2 illustrates an illuminance contour line of light irradiated by only the first light source units 2L and 2R of the left and right headlamps 1L and 1R. FIG. 3 illustrates an illuminance contour line of light irradiated by the first light source units 2L and 2R of the left and right headlamps 1L and 1R, and the second light source units 3L and 3R having the optical axis Ax2 in parallel with the optical axis Ax1. FIG. 4 illustrates an illuminance contour line of light irradiated by the first light source units 2L and 2R of the left and right headlamps 1L and 1R, and the second light source units 3L and 3R having the optical axis Ax2 inclined by a predetermined angle with respect to the optical axis Ax1. The contour lines in FIGS. 2 to 4 illustrate illuminance contour lines of light irradiated to the road surface in front of the vehicle.

Figure 3:
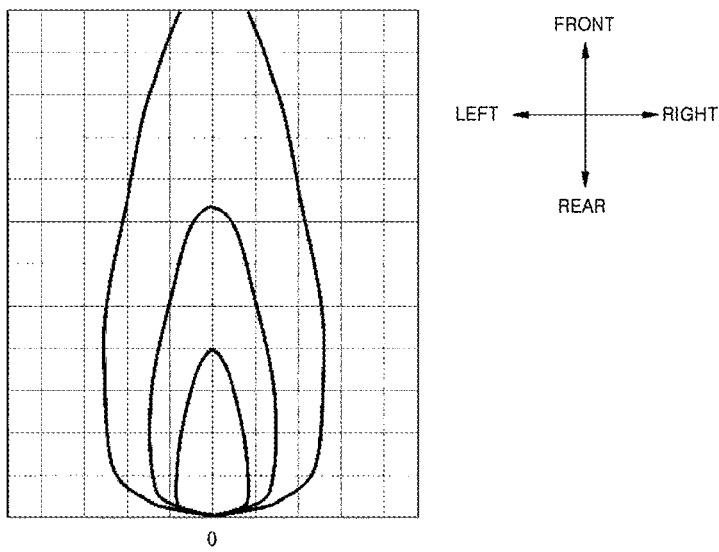
FIG. 3 is a view illustrating an illuminance contour line of light irradiated by the first light source and a second light source unit having an optical axis in parallel with an optical axis of the first light source unit of the left and right headlamps.

As illustrated in FIGS. 2 and 3, the left and right headlamps 1L and 1R may irradiate a range farther than the range irradiated by light from only the first light source units 2L and 2R, by adding light from the second light source units 3L and 3R. However, the range wide in the left-right direction at a distance is still not irradiated.

Figure 4:
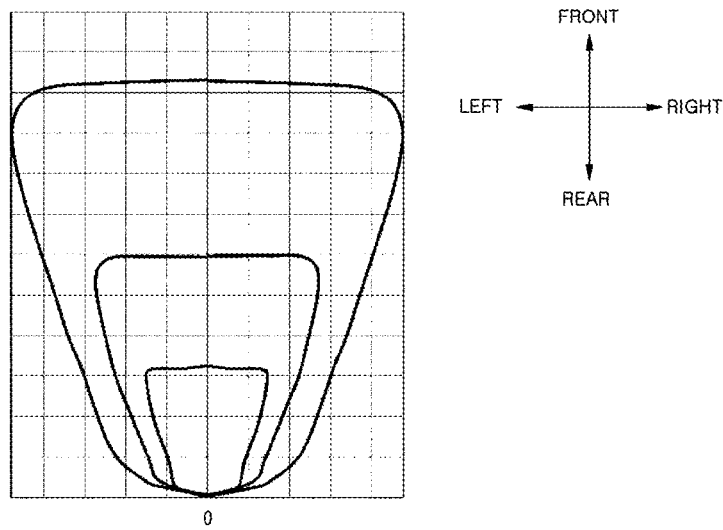
FIG. 4 is a view illustrating an illuminance contour line of light irradiated by the first light source and a second light source unit having an optical axis that is inclined by a predetermined angle with respect to the optical axis of the first light source unit of the left and right headlamps.

Meanwhile, as illustrated in FIG. 4, it is possible to irradiate the range wide in the left-right direction at a distance by inclining the optical axis Ax2 of the second light source units 3L and 3R with respect to the optical axis Ax1 of the first light source units 2L and 2R by a predetermined angle.

As described above, the vehicle headlamp 1 according to the embodiment is configured such that the optical axis Ax2 of the second light source units 3L and 3R are inclined by a predetermined angle in the left-right direction from the optical axis Ax1 of the first light source units 2L and 2R, at least while irradiating light. As a result, the vehicle headlamp 1 may secure a wide view in the left-right direction at a distance.

In the embodiment, the second light source units 3L and 3R are configured such that the optical axis Ax2 thereof is inclined toward the outside of the vehicle with respect to the optical axis Ax1 of the first light source units 2L and 2R, but the present disclosure is not limited thereto. For example, the second light source units 3L and 3R may be configured such that the optical axis Ax2 is inclined toward the inside of the vehicle with respect to the optical axis Ax1 of the first light source units 2L and 2R. In this case, the light emitted from the second light source unit 3R may be emitted to the left direction from the light emitted from the first light source unit 2L, and the light emitted from the second light source unit 3L may be emitted to the right direction from the light emitted from the first light source unit 2R.

In the embodiment, the second light source units 3L and 3R are disposed outside the vehicle from the first light source units 2L and 2R, but the present disclosure is not limited thereto. For example, the second light source units 3L and 3R may be disposed inside the vehicle from the first light source units 2L and 2R.

In the embodiment, the first light source units 2L and 2R form a high-beam light distribution pattern, but the present disclosure is not limited thereto. For example, the first light source units 2L and 2R may be configured to form a low-beam light distribution pattern in addition to the high-beam light distribution pattern.

In the embodiment, the vehicle headlamp 1 includes the first light source units 2L and 2R, and the second light source units 2L and 3R, but the present disclosure is not limited thereto. The vehicle headlamp 1 may include a light source unit that forms an auxiliary light distribution pattern that irradiates light to a region in front of the vehicle farther than the high-beam light distribution pattern at the time of forming the high-beam light distribution pattern of the first light source units 2L and 2R. Further, the vehicle headlamp 1 may include other lamps such as a clearance lamp or a low-beam lamp.

The vehicle headlamp 1 of the embodiment may include a swivel mechanism that turns the light distribution directions of the first light source units 2L and 2R and the second light source units 3L and 3R in the left-right direction, and may be configured to move the optical axes of the light source units in the left-right direction. In this case, it is possible to irradiate a high-beam light distribution pattern to a wide range at a distance in a predetermined direction, by moving the first light source units 2L and 2R and the second light source units 3L and 3R in the left-right direction while maintaining the angular relationship of the optical axes as described above.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A vehicle headlamp comprising:
    a first light source configured to form at least a high-beam light distribution pattern; and
    a second light source including a laser diode and configured to form an additional light distribution pattern that irradiates a distance equal to or farther than that of the high-beam light distribution pattern,
    wherein an optical axis of the second light source is configured to be inclined by a predetermined angle in the left-right direction from an optical axis of the first light source, at least during a period while light is irradiated.

2. The vehicle headlamp according to claim 1, wherein the first light source and the second light source are disposed inside a lamp chamber of a vehicle.

3. The vehicle headlamp according to claim 1, wherein the predetermined angle is in a range of 3° to 5°.

4. A vehicle headlamp system comprising:
    a first light source configured to form at least a high-beam light distribution pattern;
    a second light source including a laser diode and configured to form an additional light distribution pattern that irradiates a distance equal to or farther than that of the high-beam light distribution pattern;
    a third light source configured to form at least a high-beam light distribution pattern; and
    a fourth light source including a laser diode and configured to form an additional light distribution pattern that irradiates a distance equal to or farther than that of the high-beam light distribution pattern,
    wherein the first light source and the second light source are disposed inside a left lamp chamber of a vehicle, and the third light source and the fourth light source are disposed inside a right lamp chamber of the vehicle,
    an optical axis of the second light source is configured to be inclined by a predetermined angle in the left direction from an optical axis of the first light source, at least during a period while light is irradiated, and
    an optical axis of the fourth light source is configured to be inclined by a predetermined angle in the right direction from an optical axis of the third light source, at least during a period while light is irradiated.

5. The vehicle headlamp system according to claim 4, wherein the left lamp chamber and the right lamp chamber are symmetrically disposed with respect to a center line of the vehicle.

6. The vehicle headlamp system according to claim 5, wherein the second light source and the fourth light source are disposed outside the vehicle from the first light source and the third light source.

7. The vehicle headlamp system according to claim 4, wherein the predetermined angle is in a range of 3° to 5°.

* * * * *